US008140347B2

(12) United States Patent
Andra et al.

(10) Patent No.: US 8,140,347 B2
(45) Date of Patent: Mar. 20, 2012

(54) SYSTEM AND METHOD FOR SPEEDING XML CONSTRUCTION FOR A BUSINESS TRANSACTION USING PREBUILT XML WITH STATIC AND DYNAMIC SECTIONS

(75) Inventors: Rajagopal Andra, South Burlington, VT (US); Balasubramanian Gopalan, South Burlington, VT (US); Jayakumar Krishnamurthy, Framingham, MA (US); Srinivasa Kuthethur, St. Clair Shores, MI (US); Sethu Radhakrishnan, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 1659 days.

(21) Appl. No.: 10/709,793

(22) Filed: May 28, 2004

(65) Prior Publication Data
US 2005/0278345 A1 Dec. 15, 2005

(51) Int. Cl.
*G06F 17/30* (2006.01)
(52) U.S. Cl. ............................. 705/1.1; 705/35; 705/37
(58) Field of Classification Search ............... 705/37, 705/1.1, 35
See application file for complete search history.

(56) References Cited

U.S. PATENT DOCUMENTS

| | | | | |
|---|---|---|---|---|
| 2002/0042757 A1* | 4/2002 | Albazz et al. | | 705/26 |
| 2002/0042782 A1* | 4/2002 | Albazz et al. | | 705/80 |
| 2002/0091533 A1* | 7/2002 | Ims et al. | | 705/1 |
| 2002/0138399 A1* | 9/2002 | Hayes et al. | | 705/37 |
| 2002/0178103 A1* | 11/2002 | Dan et al. | | 705/37 |
| 2003/0167446 A1* | 9/2003 | Thomas | | 715/513 |
| 2005/0005116 A1* | 1/2005 | Kasi et al. | | 713/170 |
| 2006/0059024 A1* | 3/2006 | Bailey et al. | | 705/5 |

OTHER PUBLICATIONS

Meyuhas, et al., "The Operational Logic Behind Managing a Fully Automated 300 mm FEB", Semiconductor Manufacturing, Oct. 2003, pp. 152-159.
Girin, et al., "Process Control Through Lithography-Automation", Semiconductor Manufacturing, Jul. 2003, pp. 85-90.

* cited by examiner

*Primary Examiner* — Mahesh Dwivedi
(74) *Attorney, Agent, or Firm* — Richard M. Kotulak, Esq.; Gibb I.P. Law Firm, LLC

(57) ABSTRACT

A system and method for constructing extensible markup language (XML) transactions comprising an XML format run on a computer system, wherein the method comprises prebuilding static structures of an XML transaction, classifying dynamic structures of the XML transaction with empty tags and single occurrence classifiers for repeating dynamic structures, building a list of a sequence of the static and dynamic structures, linking the list to a type of XML transaction and a predetermined trading partner profile (TPP), and combining the static structures with the dynamic structures at a runtime of the XML transaction based on the sequence, the type of XML transaction, the TPP, and dynamic structures of the XML transaction, wherein the XML transaction occurs in a business-to-business (B2B) electronic environment.

18 Claims, 6 Drawing Sheets

Figure 4

TPP1

```
<Receiver>
  <ReceiverDescripton>
    <ContactDetail>
      <EmailAddress>someone@abc.com</EmailAddress>
      <TelephoneNumber>111-222-333-4444</TelephoneNumber>
    </ContactDetail>
    <PartnerRole>Shopper</PartnerRole>
    <PartnerDescription>
      <BusinessData>
        <DUNSNumber>987654321</DUNSNumber>
        <SupplyChainProduct>Modules</SupplyChainProduct>
      </BusinessData>
      <PartnerType>Vendor</PartnerType>
    </PartnerDescription>
  </ ReceiverDescripton>
</Receiver>
```

TPP2

```
<Receiver>
  <ReceiverDescripton>
    <PartnerRole>Receiver</PartnerRole>
    <PartnerDescription>
      <BusinessData>
        <DUNSNumber>987654321</DUNSNumber>
        <SupplyChainProduct>Modules</SupplyChainProduct>
      </BusinessData>
      <PartnerType>Manufacturer</PartnerType>
    </PartnerDescription>
  </ReceiverDescripton>
</Receiver>
..
..
<DocumentType>Shipment</DocumentType>
```

Figure 5

TPP Install Time

```
<Lot>
<LotIdentifier></LotIdentifier>
<WaferIdentifier> </WaferIdentifier>
<LotQuantity>
<ProductUnit> </ProductUnit>
<ProductQuantity></ProductQuantity>
</LotQuantity>
<LotDateCode></LotDateCode>
</Lot>
.. ..
```

Business XML Runtime

```
..
<Lot>
<LotIdentifier>OPXNT00B30</LotIdentifier>
<WaferIdentifier>90PDG115SJF3</WaferIdentifier>
<LotQuantity>
<ProductUnit>Each</ProductUnit>
<ProductQuantity>20.00</ProductQuantity>
</LotQuantity>
<LotDateCode>0312</LotDateCode>
</Lot>
<Lot>
<LotIdentifier>OPXNT00B31</LotIdentifier>
<WaferIdentifier>91PDG115SJF3</WaferIdentifier>
<LotQuantity>
<ProductUnit>Each</ProductUnit>
<ProductQuantity>30.00</ProductQuantity>
</LotQuantity>
<LotDateCode>0412</LotDateCode>
</Lot>
.. ..
```

SYSTEM AND METHOD FOR SPEEDING XML CONSTRUCTION FOR A BUSINESS TRANSACTION USING PREBUILT XML WITH STATIC AND DYNAMIC SECTIONS

BACKGROUND OF INVENTION

1. Field of the Invention

The invention generally relates to computer-implemented systems and methods, and more particularly to computer-implemented systems and methods for improving coding processing in a business-to-business environment.

2. Description of the Related Art

A typical extensible Markup Language (XML)-based transaction in a business-to-business (B2B) environment involves combining transaction information such as name, address, social security number, credit card number, etc. from various data sources. Some of this information is fixed for a given trading partner, transaction, and set of business rules. Existing solutions store the trading partner rules and transaction information in a database or file or in an XML format, which is then read and translated to the output XML format in the computer system running the B2B exchange. Unfortunately, in a heavy B2B transaction environment, the incremental costs associated with reading and translating the stored information can be significantly high.

XML files that carry B2B messages have varied static and dynamic content dependent on the trading partner profile (TPP). Within a given business message in an XML format, different business partners require different views of data as defined by the TPP. The result is an XML file that has static sections that are structurally the same but with different views of data. However, building a static structure has several disadvantages including a redundant/repetitive code, and that the static structure and content are intertwined with the business logic. Other disadvantages are that the static structure is not modular, which leads to limited reusability, and is not flexible, whereby changes might involve logic from several TPPs. Additionally, static structures are not scalable, wherein the introduction of a new TPP in the electronic B2B exchange requires additional code to be read, entered, and stored. Also, "building" an XML file for a given transaction is slower and inefficient because of building the aforementioned static portion and because of runtime inefficiencies.

Conventional techniques relating to different areas of XML technology exist. For example, XML techniques have been previously described for (1) XML construction—in U.S. Pat. No. 6,635,089 issued to Burkett et al; (2) XML storage in U.S. Pat. No. 6,643,633 issued to Chau et al.; (3) XML data integrity—in U.S. Pat. No. 6,687,848 issued to Najmi; and (4) XML translation—in U.S. Pat. No. 6,601,071 issued to Bowker et al., the complete disclosures of which in their entireties, are herein incorporated by reference. However, the conventional techniques may not fully provide for a solution that provides for XML file construction, structure integrity, and mass customization, which are three significant areas requiring a solution as identified by the industry.

Therefore, there remains a need for a novel system and method for speeding XML file construction for a B2B transaction which overcomes the deficiencies of the conventional approaches and which results in an overall reduction in the execution time of the B2B transaction.

SUMMARY OF INVENTION

In view of the foregoing, the invention provides a method for constructing XML transactions comprising an XML format run on a computer system, wherein the method comprises pre-building static structures of an XML transaction, classifying dynamic structures of the XML transaction with empty tags and single occurrence classifiers for repeating dynamic structures, building a list of a sequence of the static and dynamic structures, linking the list to a type of XML transaction and a predetermined TPP, and combining the static structures with the dynamic structures at the runtime of the XML transaction based on the sequence, the type of XML transaction, the TPP, and dynamic structures of the XML transaction, wherein the XML transaction occurs in a business-to-business (B2B) electronic environment.

The method further comprises predefining the TPP associated with a predetermined trading entity. Also, the pre-building of the static structures occurs prior to runtime of the XML transaction. The method further comprises creating a copy of a pre-defined data type definition format comprising the XML format, and constructing a final XML structure based on the step of combining, wherein the final XML structure is validated by comparing the final XML structure against the copy of the data type definition format. Additionally, the TPP comprises partner data, communication protocol data, transaction data, transaction format data, and XML format version data. Furthermore, the pre-building of the static and dynamic structures occurs at a time of installation of the TPP in a database in the computer system. Also, the method further comprises linking the static structures to a type of XML transaction and the predetermined TPP, storing the linked static structures in the database, and filling the empty tags of the dynamic structures with actual business data for the transaction and building multiple repeating dynamic structures at runtime of the XML transaction.

In another embodiment, the invention provides a program storage device implementing the method for constructing XML transactions comprising an XML format run on a computer system. According to another embodiment, the invention provides a computer system operable for constructing XML transactions comprising an XML format, wherein the computer system comprises means for pre-building static structures of an XML transaction, means for classifying dynamic structures of the XML transaction with empty tags and single occurrence classifiers for repeating dynamic structures, means for building a list of a sequence of the static and dynamic structures, means for linking the list to a type of XML transaction and a predetermined TPP, and means for combining the static structures with the dynamic structures at a runtime of the XML transaction based on the sequence, the type of XML transaction, the TPP, and dynamic structures of the XML transaction.

Moreover, the computer system further comprises means for predefining the TPP associated with a predetermined trading entity, means for creating a copy of a data type definition format comprising the XML format, means for filling the empty tags of the dynamic structures with actual business data for the transaction and building multiple repeating dynamic structures at runtime of the XML transaction, means for constructing a final XML structure using the means for combining, wherein the final XML structure is validated by comparing the final XML structure against the copy of the data type definition format, means for linking the static structures to a type of XML transaction and the predetermined trading partner profile, and means for storing the linked static structures.

Because an XML-based transaction involves combining transaction information from various data sources with some of this information being fixed for a given trading partner, transaction, and set of business rules, the invention provides a technique of separating the static and dynamic components of the XML and ties it to a trading partner and transaction, pre-builds the static component and a dynamic skeleton, and then builds the dynamic skeleton further at execution time. The approach provided by the invention significantly accelerates the XML construction time for a given B2B transaction.

According to the invention, only static sections are pre-built, and the pre-built static sections are linked to the TPP. Moreover, the XML is constructed starting from DTD applying any available static sections, and building dynamic sections thereafter. Furthermore, the invention solves some very specific B2B/XML problems. First, to solve the problem of repetitive building of static data elements of an XML, the invention uses pre-built static components. Second, to solve the problem of static data which is different for different partner/transactions, the invention links to a TPP. Third, to solve the problem of an XML that is woven together from components that could have structural errors, the invention uses DTD validation after construction.

These and other aspects of the invention will be better appreciated and understood when considered in conjunction with the following description and the accompanying drawings. It should be understood, however, that the following description, while indicating preferred embodiments of the invention and numerous specific details thereof, is given by way of illustration and not of limitation. Many changes and modifications may be made within the scope of the invention without departing from the spirit thereof, and the invention includes all such modifications.

BRIEF DESCRIPTION OF DRAWINGS

The invention will be better understood from the following detailed description with reference to the drawings, in which:

FIG. 4 is a first example of a pseudo-code for a B2B transaction according to an embodiment of the invention;

FIG. 5 is a second example of a pseudo-code for a B2B transaction according to an embodiment of the invention.

DETAILED DESCRIPTION

Figure 1:
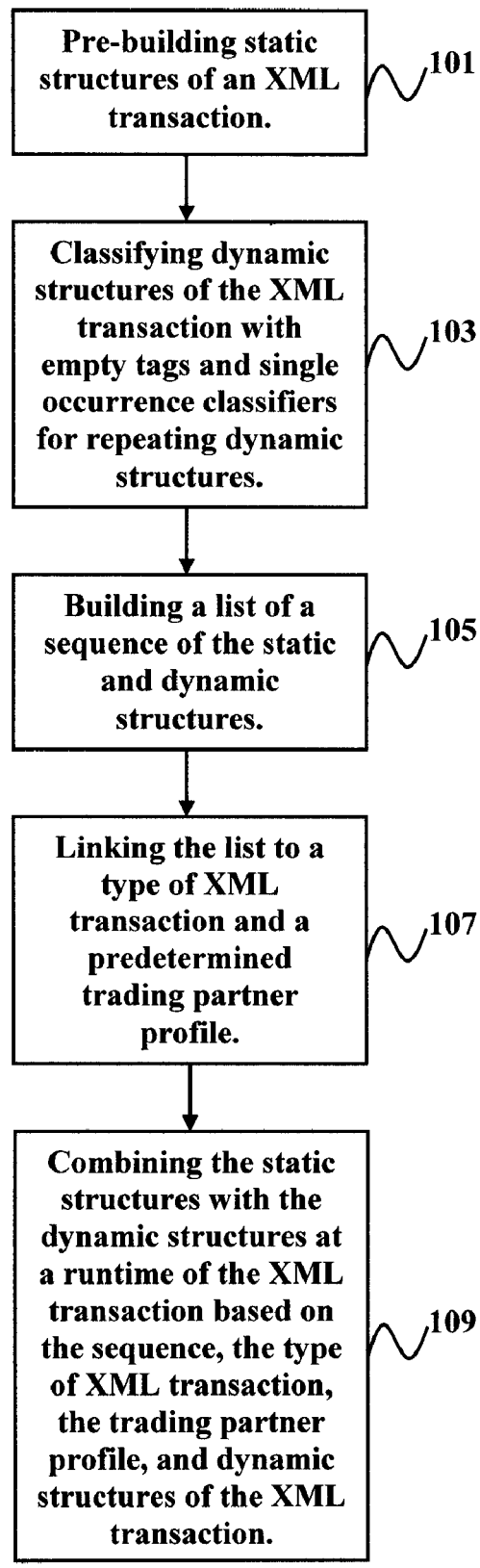
FIG. 1 is a flow diagram illustrating a preferred method of the invention.

The invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the invention. The examples used herein are intended merely to facilitate an understanding of ways in which the invention may be practiced and to further enable those of skill in the art to practice the invention. Accordingly, the examples should not be construed as limiting the scope of the invention.

As previously mentioned, the conventional techniques may not fully provide for a solution that provides for XML file construction, structure integrity, and mass customization. Additionally, because there remains a need for a novel system and method for speeding XML file construction for a B2B transaction which overcomes the deficiencies of the conventional approaches and which results in an overall reduction in the execution time, the invention has been devised to provide a solution for the above-identified problems. Referring now to the drawings, and more particularly to FIGS. 1 through 6, there are shown preferred embodiments of the invention.

FIG. 1 illustrates a method for constructing extensible markup language (XML) transactions comprising an XML format run on a computer system, according to a preferred embodiment of the invention. As shown in FIG. 1, the method comprises pre-building (101) static structures of an XML transaction, classifying (103) dynamic structures of the XML transaction with empty tags and single occurrence classifiers for repeating dynamic structures, building (105) a list of a sequence of the static and dynamic structures, linking (107) the list to a type of XML transaction and a predetermined trading partner profile (TPP), and combining (109) the static structures with the dynamic structures at a runtime of the XML transaction based on the sequence, the type of XML transaction, the TPP, and dynamic structures of the XML transaction, wherein the XML transaction occurs in a business-to-business (B2B) electronic environment. Generally, the XML language format includes tags that name fields and mark the beginnings and ends of fields, and values for those fields. Basically, a static structure is a pre-built XML structure with pre-filled values based on the associated transaction type and TPP, and a dynamic structure includes a pre-built dynamic section having empty tags and a single occurrence of a repeating dynamic structure. As described below, the empty tags and multiple occurrences of the dynamic structures will be built at runtime.

The method further comprises predefining the TPP associated with a predetermined trading entity. Also, the pre-building of the static structures occurs prior to runtime of the XML transaction. The method further comprises creating a copy of a pre-defined data type definition format comprising the XML format, and constructing a final XML structure based on the step of combining (109), wherein the final XML structure is validated by comparing the final XML structure against the copy of the data type definition format. The method further comprises, at the runtime of the XML transaction, filling the empty tags of the dynamic structures with actual business data for the XML transaction (ex. shipped quantity value) and building multiple repeating dynamic structures. Additionally, the TPP comprises partner data, communication protocol data, transaction data, transaction format data, and XML format version data. Furthermore, the pre-building of the static and dynamic structures occurs at a time of installation of the TPP in a database in the computer system. Also, the method further comprises linking the static structures to a type of XML transaction and the predetermined trading partner profile, and storing the linked static structures in the database. Generally, custom generated code based on XML, Java-based XML parsers and Java-based data access tools, and XML editors may be used to implement the method described above.

Figure 2:
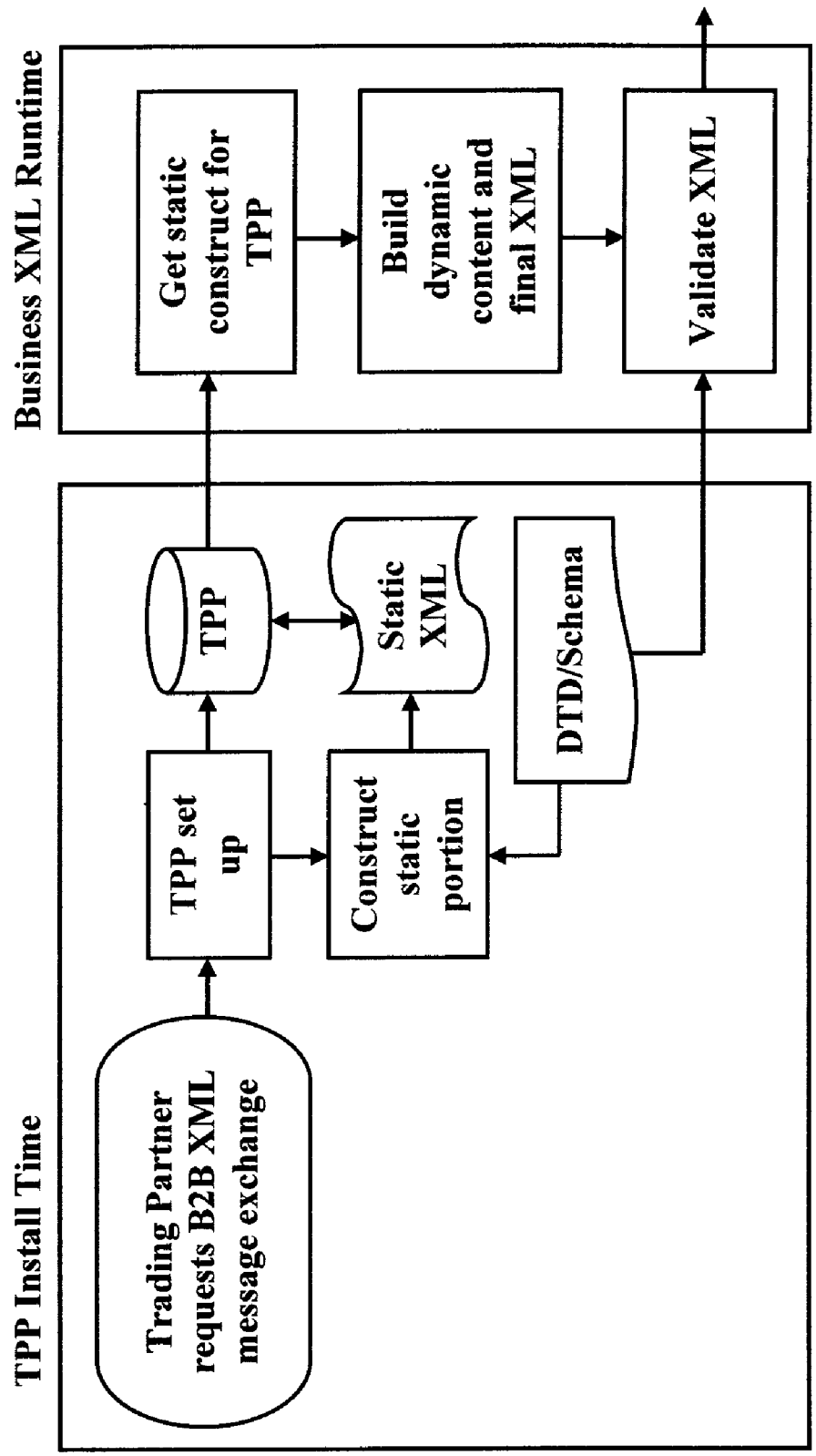
FIG. 2 is a flow diagram illustrating an embodiment of the invention.
Figure 3:
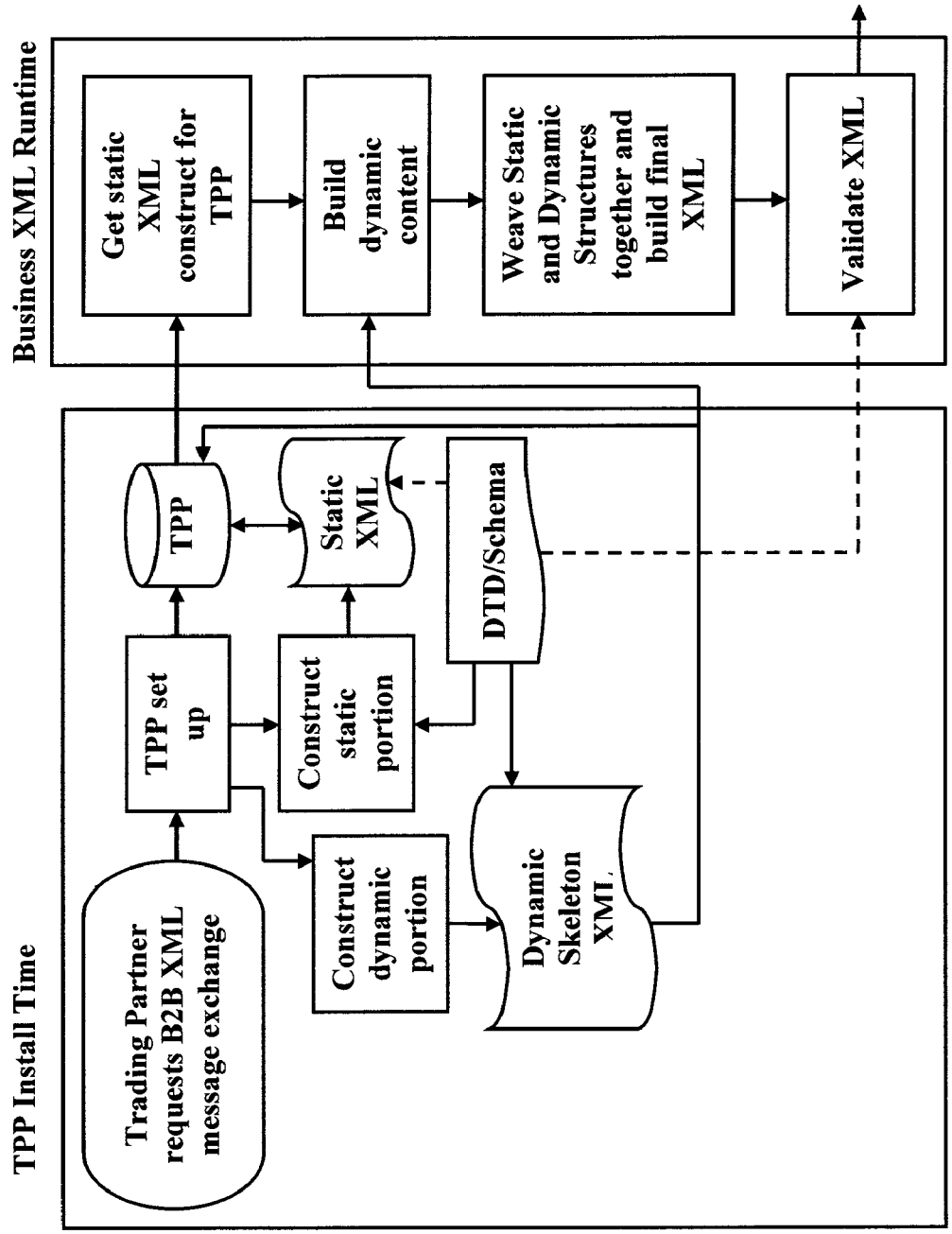
FIG. 3 is a flow diagram illustrating another embodiment of the invention.

As illustrated in the flow diagrams of FIGS. 2 and 3, the invention provides a technique for constructing an XML format in a B2B-based transaction. The invention generally includes the steps of a predefining a TPP, predefining an XML structure for the trading partner and transaction, and identifying a static section within the XML structure for a given trading partner and transaction. Moreover, the invention includes identifying a dynamic section within the XML structure for a given trading partner and transaction, pre-building the static section of the XML, pre-building a skeleton of the dynamic section of XML with empty tags and a single occurrence classifier of repeating structures, and linking the pre-built section (static and dynamic skeleton) to a given trading partner and transaction. Finally, the invention provides for constructing the final XML by filling the empty tags (with actual business data for the XML transaction) of the dynamic section and building the repeating structures of the dynamic section of the XML at runtime based on the trading partner and transaction requirement.

More specifically, the invention pre-builds the static structure and content of business XML files at TPP installation time as opposed to building it at the transaction runtime. Moreover, at installation time, the invention builds dynamic sections of the XML with empty tags and with a single occurrence classifier for repeating structures. Also, at installation time, the invention builds a list of the sequence of static and dynamic structures. Then, at runtime, the invention combines the static and built dynamic sections of the XML using business logic. In this context, business logic includes the set of business rules relating to the transaction type and trading entity that determines business data relationships and data hierarchy. Accordingly, the invention provides for a varied static structure and content by TPP for the same business XML and separates the business logic from the repetitive static structure and content. Additionally, the invention provides a faster construction of the XML transactions at transaction runtime since only the dynamic content is built using business logic. As such, the invention is flexible by making changes transparent to the business logic and is scalable by adding a pre-built static XML linked to a new TPP. Generally, changes transparent to the business logic includes changes in XML grammar and structure that will not have an impact on the business logic. In terms of scalability, the new TPP-specific pre-built static XML can be easily added without code changes and without impacting existing TPP transactions according to an embodiment of the invention.

The invention operates in the following manner. A business partner agrees to send a business transaction in a mutually agreed upon XML format (proprietary or standards based), called a Data Type Definition (DTD) format. Next, a TPP is created in a database that holds information about the partner, the communication protocol used, the enabled transaction, format of transaction, and XML format version. Then, a copy of the DTD is created. Thereafter, static elements of the XML are filled with predetermined values based on the TPP and are stored using an editor. The static sections are linked to the TPP and transaction, and are stored in the database. At execution time, based on the TPP and transaction combination, the corresponding static sections are taken and the application specific dynamic sections are built to construct the final XML. Execution time is defined as the transaction runtime (that is, sending the transaction to the trading partner). The constructed XML is then run against (compared against) the DTD to validate the structure.

When enabling a trading partner transaction, the following activities are performed at the time of installation. First, a TPP with connection parameters, transaction format, and XML format version is created. Second, a DTD (or Schema) is defined for the transaction, the static portions of the XML structure are generated, and static values (as applicable to the TPP) are filled using a generic tool such as a XML editor. Then, the pre-built static XML is linked to the TPP so that it can be easily located at transaction runtime. At runtime, a program containing business transformation logic builds the dynamic structure and content and combines them into the static structure. Next, the constructed final XML (combined static and dynamic structures) is validated against the DTD/Schema to prove the integrity.

FIG. 4 shows an example pseudocode of how a pre-built static XML will appear at the time of installation (left side), and at the transaction runtime (right side). FIG. 5 shows an example pseudocode of a dynamic pre-built structure with a single occurrence at the time of installation (left side), and the dynamic content and repeating structures at the transaction runtime (right side).

Figure 6:
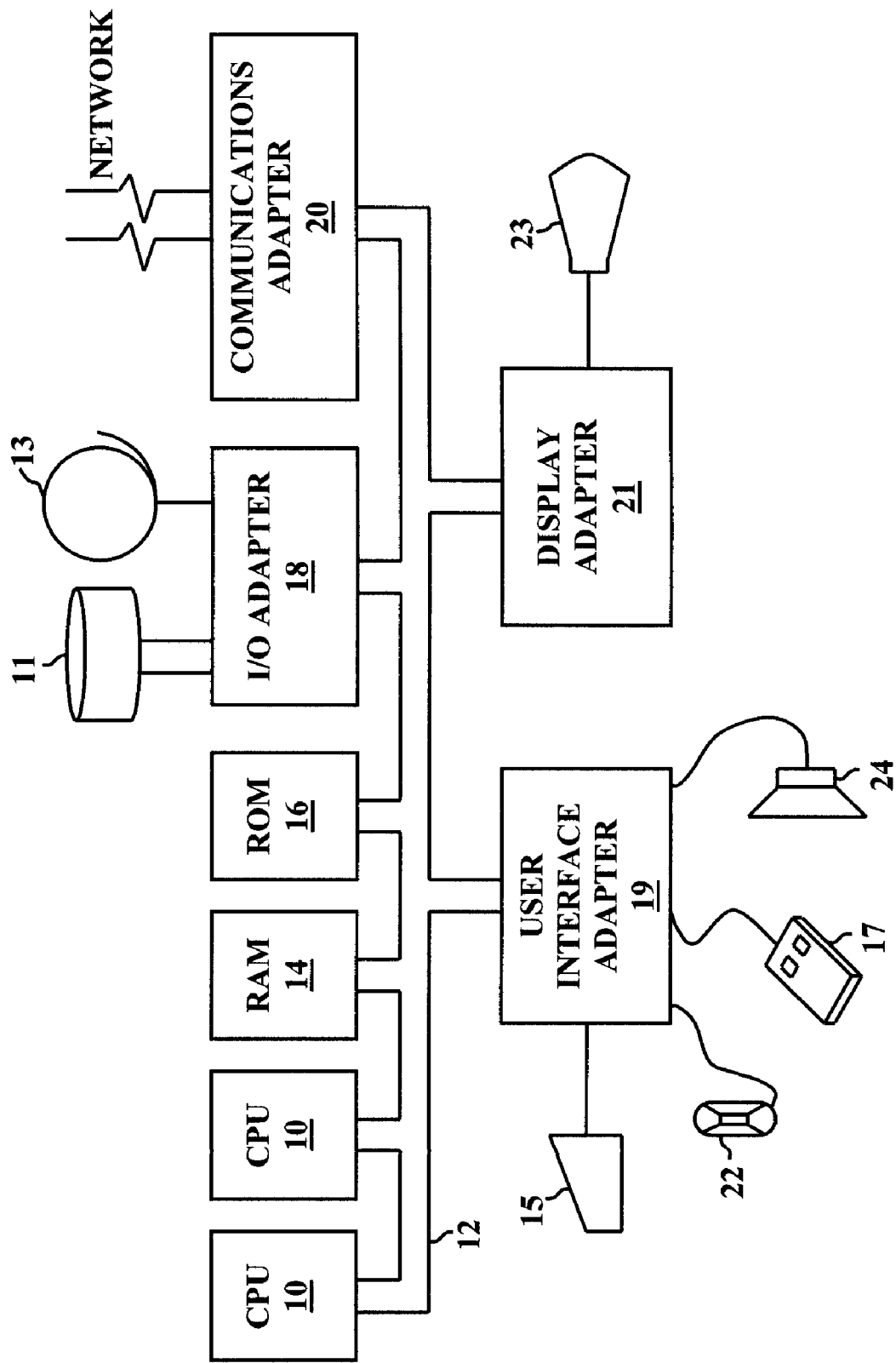
FIG. 6 is a computer system diagram according to an embodiment of the invention.

A representative hardware environment for practicing the invention is depicted in FIG. 6, which illustrates a typical hardware configuration of an information handling/computer system, used in accordance with the invention, having at least one processor or central processing unit (CPU) 10. The CPUs 10 are interconnected via system bus 12 to random access memory (RAM) 14, read-only memory (ROM) 16, an input/output (I/O) adapter 18 for connecting peripheral devices, such as disk units 11 and tape chives 13, to bus 12, user interface adapter 19 for connecting keyboard 15, mouse 17, speaker 24, microphone 22, and/or other user interface devices such as a touch screen device (not shown) to bus 12, communication adapter 20 for connecting the information handling system to a data processing network, and display adapter 21 for connecting bus 12 to display device 23. A program storage device readable by the disk or tape units is used to load the instructions, which operate the invention, which is loaded onto the computer system.

Additionally, the invention provides a computer system operable for constructing XML transactions comprising an XML format, wherein the computer system comprises means for pre-building static structures of an XML transaction, means for classifying dynamic structures of the XML transaction with empty tags and single occurrence classifiers for repeating dynamic structures, means for building a list of a sequence of the static and dynamic structures, means for linking the list to a type of XML transaction and a predetermined TPP, and means for combining the static structures with the dynamic structures at a runtime of the XML transaction based on the sequence, the type of XML transaction, the TPP, and dynamic structures of the XML transaction.

Furthermore, the computer system further comprises means for predefining the TPP associated with a predetermined trading entity, means for creating a copy of a data type definition format comprising the XML format, means for filling the empty tags of said dynamic structures with actual business data for the XML transaction and building multiple repeating dynamic structures at runtime of the XML transaction, means for constructing a final XML structure using the means for combining, wherein the final XML structure is validated by comparing the final XML structure against the copy of the data type definition format, means for linking the static structures to a type of XML transaction and the predetermined TPP, and means for storing the linked static structures. The computing system may incorporate custom generated code based on XML, Java-based XML parsers and Java-based data access tools, XML editors, computers, calculators, and other data generation, consolidation, and calculation devices which run executable coding functions, and are arranged to perform the functions described above.

According to the invention, only static sections are pre-built, and the pre-built static sections are linked to the TPP. Moreover, the XML is constructed starting from DTD applying any available static sections, and building dynamic sections thereafter. Furthermore, the invention solves some very specific B2B/XML problems. First, to solve the problem of repetitive building of static data elements of an XML, the invention uses pre-built static components. Second, to solve the problem of static data which is different for different partner/transactions, the invention links to a TPP. Third, to solve the problem of an XML that is woven together from components that could have structural errors, the invention uses DTD validation after construction.

Additionally, the invention is different from other conventional solutions such as building a HTML screen because unlike building a HTML, the invention's XML construction follows DTD definitions and the invention's constructed XML is validated against DTD unlike HTML construction. Also, according to the invention, the XML includes information about the partners, the protocol, and the transaction. Furthermore, the XML is intended to be in a machine-readable format, which is unlike HTML, which is designed for human-readability.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the invention has been described in terms of preferred embodiments, those skilled in the art will recognize that the invention can be practiced with modification within the spirit and scope of the appended claims.

The invention claimed is:

1. A method for constructing extensible markup language (XML) transactions comprising an XML format run on a computer system, said method comprising:
    establishing an original pre-defined data type definition format for an XML transaction;
    creating a copy of said original pre-defined data type definition format for said XML transaction;
    pre-building static structures of said XML transaction, wherein said static structures comprise a pre-built XML data structure with pre-filled values based on a transaction type of said XML transaction and a predetermined trading partner profile;
    classifying dynamic structures of said XML transaction with empty tags and single occurrence classifiers for repeating dynamic structures;
    building a list of a sequence of said static and dynamic structures;
    linking said list to the XML transaction and said predetermined trading partner profile;
    combining said static structures with said dynamic structures at a runtime to construct said XML transaction based on said sequence, said XML transaction, said trading partner profile, and said dynamic structures of said XML transaction, wherein an occurrence of said runtime of said XML transaction occurs when said XML transaction is sent to a trading partner, wherein said combining comprises filling the empty tags of said dynamic structures; and
    constructing a final XML structure based on the combining process, wherein said final XML structure comprises fully built dynamic structures that comprise completely filled tags, and wherein said final XML structure is validated by comparing said final XML structure against said copy of said original pre-defined data type definition format for said XML transaction.

2. The method of claim 1, wherein said XML transaction occurs in a business-to-business (B2B) electronic environment.

3. The method of claim 1, further comprising predefining said trading partner profile associated with a predetermined trading entity.

4. The method of claim 1, wherein said pre-building of said static structures occurs prior to runtime of said XML transaction.

5. The method of claim 1, wherein the construction of said final XML structure follows definitions established by said copy of said original pre-defined data type definition format for said XML transaction.

6. The method of claim 1, further comprising filling said empty tags of said dynamic structures with business data values and building multiple repeating dynamic structures at runtime of said XML transaction.

7. The method of claim 3, wherein said trading partner profile comprises partner data, communication protocol data, transaction data, transaction format data, and XML format version data.

8. The method of claim 3, wherein said pre-building of said static structures and a pre-building of said dynamic structures occurs at a time of installation of said trading partner profile in a database in said computer system.

9. The method of claim 8, further comprising:
    linking said static structures to a type of XML transaction and said predetermined trading partner profile; and
    storing the linked static structures in said database.

10. A program storage device readable by computer, tangibly embodying a program of instructions executable by said computer to perform a method for constructing extensible markup language (XML) transactions comprising an XML format run on a computer system, said method comprising:
    establishing an original pre-defined data type definition format for an XML transaction;
    creating a copy of said original pre-defined data type definition format for said XML transaction;
    pre-building static structures of said XML transaction, wherein said static structures comprise a pre-built XML data structure with pre-filled values based on a transaction type of said XML transaction and a predetermined trading partner profile;
    classifying dynamic structures of said XML transaction with empty tags and single occurrence classifiers for repeating dynamic structures;
    building a list of a sequence of said static and dynamic structures;
    linking said list to the type of XML transaction and said predetermined trading partner profile;
    combining said static structures with said dynamic structures at a runtime of said XML transaction based on said sequence, said type of XML transaction, said trading partner profile, and said dynamic structures of said XML transaction, wherein an occurrence of said runtime of said XML transaction occurs when said XML transaction is sent to a trading partner, wherein said combining comprises filling the empty tags of said dynamic structures; and
    constructing a final XML structure based on the combining process, wherein said final XML structure comprises fully built dynamic structures that comprise completely filled tags, and wherein said final XML structure is validated by comparing said final XML structure against said copy of said original pre-defined data type definition format for said XML transaction.

11. The program storage device of claim 10, wherein said XML transaction occurs in a business-to-business (B2B) electronic environment.

12. The program storage device of claim 10, wherein said method further comprises predefining said trading partner profile associated with a predetermined trading entity.

13. The program storage device of claim 10, wherein said pre-building of said static structures occurs prior to runtime of said XML transaction.

14. The program storage device of claim 10, wherein the construction of said final XML structure follows definitions established by said copy of said original pre-defined data type definition format for said XML transaction.

15. The program storage device of claim 10, wherein said method further comprises filling said empty tags of said dynamic structures with business data values and building multiple repeating dynamic structures at runtime of said XML transaction.

16. The program storage device of claim 12, wherein said trading partner profile comprises partner data, communication protocol data, transaction data, transaction format data, and XML format version data.

17. The program storage device of claim 12, wherein said pre-building of said static structures and a pre-building of said dynamic structures occurs at a time of installation of said trading partner profile in a database in said computer system.

18. The program storage device of claim 17, wherein said method further comprises:
 linking said static structures to a type of XML transaction and said predetermined trading partner profile; and
 storing the linked static structures in said database.

* * * * *